Patented Mar. 23, 1954

2,673,184

UNITED STATES PATENT OFFICE 2,673,184

LUBRICATING GREASE PREPARED FROM THE ESTERS OF THE DIMER OF LINOLEIC ACID

Arnold J. Morway, Clark-Rahway, David W. Young, Westfield, and Delmer L. Cottle, Highland Park, N. J., assignors to Standard Oil Development Company, a corporation of Delaware No Drawing. Application February 27, 1953, Serial No. 339,492

6 Claims. (Cl. 252—41)

This invention relates to lubricating grease compositions. Particularly the invention relates to novel lubricating grease compositions which comprise the $C_1$ to $C_{18}$ alcohol esters of dilinoleic acid thickened with a minor amount of a lithium soap.

Linoleic acid which occurs in a large number of natural oils may be polymerized by heating at a temperature of about 330° C. to 360° C. Usually the polymerization is carried out in the presence of an acid clay catalyst in an atmosphere of steam. A period of from 3 to 8 hours is normally used and pressures of from about 85 to 400 p. s. i. are required. The resulting product consists essentially of the dimer of linoleic acid but minor proportions usually about 12% of the trimer are also formed. Methods for carrying out these polymerization procedures in detail may be found in the article by Charles G. Goebel, Journal of the American Oil Chemists Society, volume 25, pp. 65–68 (1947). The dimer is of particular interest in the present invention and is believed to have the formula:

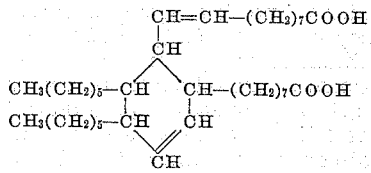

It has now been found and forms the object of this invention that satisfactory lubricating grease compositions may be prepared from the esters of the dimer of linoleic acid.

The esters of the dimer may be prepared by any of the well known esterification procedures described in the literature. For example, the dimer acid may be reacted with $C_1$ to $C_{18}$ aliphatic alcohol using 2 mols of the alcohol per mol of the acid. Ordinarily the esterification is carried out in the presence of a minor amount of an acid catalyst such as sulfuric acid, phosphoric acid, p-toluenesulfonic acid, etc. The water of esterification is removed during the course of the reaction. Temperatures of about 60° C. to 200° C. for about 4 to 48 hours are ordinarily used. The exact conditions will depend of course upon the esterifying alcohol. Esters of the dimer acid which may be used are those esters obtained by reacting with a molar proportion of the dimer acid 2 mols of such alcohols as methyl, propyl, butyl, hexyl, decyl, lauryl, and stearyl alcohols. It has also been found that if the esterifying alcohol is of branched chain structure the resulting grease composition has excellent properties.

Such alcohols as isooctyl alcohol, 2-ethylbutyl alcohol, 2-ethylhexyl alcohol and the $C_3$ to $C_{13}$ oxo alcohols may be used. This latter group of alcohols are prepared by subjecting an olefin to the reaction of carbon monoxide and hydrogen in the presence of a cobalt catalyst and at high temperatures and pressures.

The diesters of the dimer acid may also be hydrogenated if desired prior to the thickening with the thickening agent.

If desired the dimer acid esters may be blended with other low molecular weight diesters such as the $C_6$ to $C_{10}$ diesters of phthalic acid, adipic acid, sebacic acid, etc., these dibasic acids being only exemplary and any dibasic acid being operable.

The oil base for the grease compositions of this invention may be thickened with any of the well known grease-making soaps. The alkali or alkaline earth metal soaps of such well known fatty acids as stearic acid, oleic acid, hydroxy stearic acid, hydrogenated fish oil acids, glycerides or mixtures of the above may be used. The lithium soaps of these acids are preferred and especially preferred is a mixture of equal proportions of the lithium soaps of hydrogenated fish oil acids and crotonic acid. This mixture of soaps forms a stable complex which imparts such properties to the greases of invention. Acetic acid and furoic acid may also be used to form a complex with the high molecular weight acid. Ordinarily from 5% to 20% by weight of the soap will be used with from 7.5% to 15% by weight being especially preferred.

The soaps may be pre-formed or they may be prepared in situ. In the latter case they are prepared in a small amount of an inert fluid such as mineral oil prior to the addition to the dimer acid ester.

It is within the concept of this invention to thicken the dimer acid esters with non-soap thickeners such as methyl cellulose, N-stearoyl-p-amino-phenol and the like.

The preparation of the lubricating greases of invention are carried out in accordance with the following general procedure. The pre-formed soap and the ester are mixed and heated with stirring until solution results. Any additive materials desired, such as antioxidants, are then added and the grease cooled. It is imperative that rapid cooling of the grease occur otherwise the soaps will not crystallize properly to give a grease structure due to the absorption of the dimer acid ester on the soap nuclei. The following examples illustrate the concept of this invention without being limiting.

EXAMPLE I

Formulation

| | Per cent |
|---|---|
| Methyl ester of dilinoleic acid | 50 |
| $C_8$ oxo adipate | 34 |
| Lithium complex soap [1] | 15 |
| Oxidation inhibitor | 1 |

[1] 1:1 ratio of the lithium soap of hydrogenated fish oil acids and lithium crotonate.

Preparation

The esters were admixed with the soap in dry form and the total mixture heated with stirring to about 520° F. The oxidation inhibitor was then added and the grease chilled by pouring into thin layers in a metal pan.

Properties

| | |
|---|---|
| Dropping point, °F | 382 |
| Penetrations, 77° F., mm./10: | |
| Unworked | 200 |
| Worked (60 strokes) | 210 |
| Worked (50,000 strokes) | 235 |
| Water washing test, % loss | No loss |

EXAMPLE II

Formulation

| | Per cent |
|---|---|
| Methyl ester of dilinoleic acid | 25.0 |
| $C_8$ oxo adipate | 74.0 |
| Lithium complex soap | 5.0 |
| Oxidation inhibitor | 1.0 |

Preparation

Same as Example I above.

Properties

| | |
|---|---|
| Dropping point, °F | 450 |
| Penetrations, 77° F., mm./10: | |
| Unworked | 240 |
| Worked (60 strokes) | 265 |
| Worked (50,000 strokes) | 285 |
| Water washing test, % loss | 0.0 |

EXAMPLE III

Formulation

| | Per cent |
|---|---|
| Methyl ester of dilinoleic acid | 5.0 |
| Di-2-ethylhexyl sebacate | 79.0 |
| Lithium stearate | 15.0 |
| Oxidation inhibitor | 1.0 |

Preparation

Same as Example I above, except that heating was discontinued at 420° F.

Properties

| | |
|---|---|
| Dropping point, °F | 385 |
| Penetrations, 77° F., mm./10: | |
| Unworked | 275 |
| Worked (60 strokes) | 285 |
| Worked (50,000 strokes) | 300 |
| Water washing test, % loss | 0.0 |

EXAMPLE IV

Formulation

| | Per cent |
|---|---|
| $C_8$ oxo esters of dilinoleic acid | 44.5 |
| Di-2-ethylhexyl sebacate | 44.5 |
| Lithium complex soap | 10.0 |
| Phenyl alpha naphthylamine | 1.0 |

Preparation

Same as Example I above.

EXAMPLE V

Formulation

| | Per cent |
|---|---|
| $C_8$ oxo diester of dilinoleic acid | 84 |
| Lithium complex soap | 15 |
| Phenyl alpha naphthylamine | 1 |

Preparation

Same as Example I above.

Properties

| | |
|---|---|
| Dropping point, °F | 425 |
| Penetrations, 77° F., mm./10: | |
| Unworked | 275 |
| Worked (60 strokes) | 295 |
| Worked (50,000 strokes) | 335 |
| Water washing test, % loss | 5 |

To summarize briefly this invention relates to the formation of novel lubricating grease compositions prepared by thickening to a grease consistency a $C_1$ to $C_{18}$ alcohol diester of the dimer of linoleic acid. If desired there may be blended with the dimer acid ester a diester of a dibasic acid such as adipic acid, sebacic acid, phthalic acid and the like. The lithium soaps of high molecular weight fatty acids are preferred and especially preferred are the complexes formed from a lithium soap of a high molecular weight substantially saturated fatty acid and the lithium salt of a low molecular weight fatty acid.

What is claimed is:

1. A lubricating grease composition which comprises the $C_1$ to $C_{18}$ alcohol diester of the dimer of linoleic acid thickened to a grease consistency with a lithium soap of a high molecular weight substantially saturated fatty acid.

2. A lubricating grease composition which comprises the $C_1$ to $C_{10}$ aliphatic alcohol diester of the dimer of linoleic acid thickened to a grease consistency with from 5.0% to 20.0% by weight of the lithium soap of a mixture of equal parts of hydrogenated fish oil acids and crotonic acid.

3. A lubricating grease composition which consists essentially of a mixture of the $C_1$ to $C_{10}$ alcohol diester of the dimer of linoleic acid and a dibasic acid ester selected from the class consisting of adipic and sebacic acids, said mixture thickened to a grease consistency with the lithium soap of a mixture of equal parts of hydrogenated fish oil acid and crotonic acid.

4. A lubricating grease composition according to claim 3 wherein said dibasic acid ester is the $C_8$ oxo alcohol ester of adipic acid.

5. A lubricating grease composition according to claim 3 wherein said dibasic acid ester is di-2-ethylhexyl sebacate.

6. A lubricating grease composition according to claim 3 wherein said dibasic acid ester is isooctyl phthalate.

ARNOLD J. MORWAY.
DAVID W. YOUNG.
DELMER L. COTTLE.

References Cited in the file of this patent

UNITED STATES PATENTS

| Number | Name | Date |
|---|---|---|
| 2,411,178 | Young et al. | Nov. 19, 1946 |
| 2,482,761 | Goebel | Sept. 27, 1949 |
| 2,631,979 | McDermott | Mar. 17, 1953 |